Dec. 3, 1957 W. PECHY 2,815,077
SLITTER ELEMENT MOUNTINGS FOR SHEET SLITTING MACHINES
Filed Feb. 12, 1954
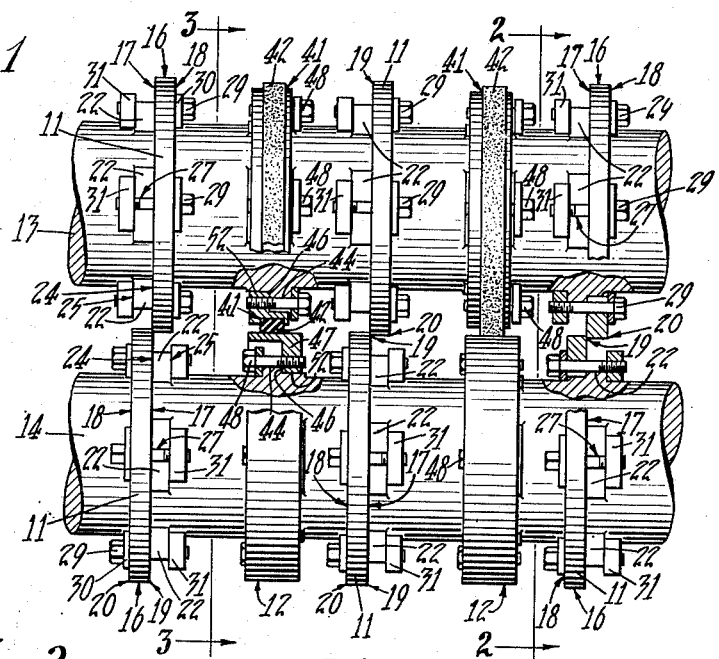
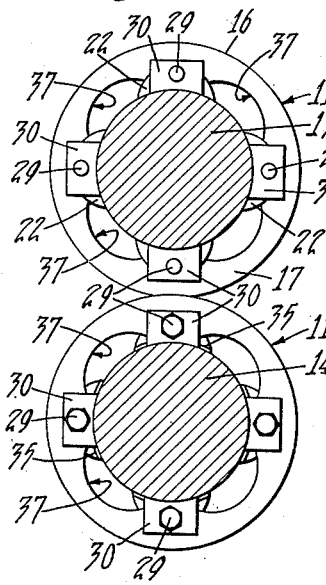
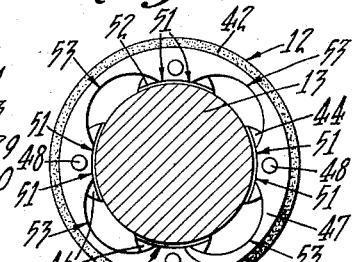
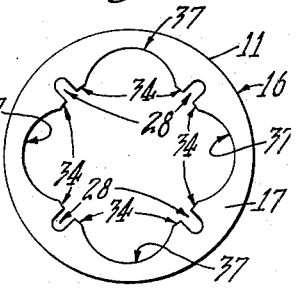
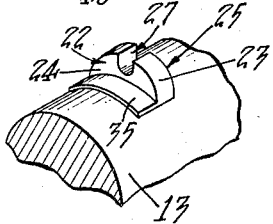
INVENTOR.
WILLIAM PECHY
BY Charles H. Erne
Leland R. McCann
George W. Reiber
ATTORNEYS

United States Patent Office 2,815,077
Patented Dec. 3, 1957

2,815,077
SLITTER ELEMENT MOUNTINGS FOR SHEET SLITTING MACHINES

William Pechy, Belmar, N. J., assignor to American Can Company, New York, N. Y., a corporation of New Jersey Application February 12, 1954, Serial No. 409,962

8 Claims. (Cl. 164—60)

The present invention relates to sheet slitting machines and has particular reference to improved devices for mounting, removing and remounting the slitting elements or members onto shafts that rotate them.

In the container or can making industry slitting machines are utilized to cut large sheets into smaller strips or blanks from which container or can bodies and other container parts are made. The cutting of the sheets into smaller strips is effected by cooperating pairs of rotary cutting wheels or cutters, which surround and are mounted on a pair of parallel shafts, between which cutters the sheets are fed for the cutting operation. Feeding of the sheets between the cutters usually is effected by pairs of cooperating feed rollers mounted on the same shafts and disposed adjacent and between the cutters. Each shaft usually carries several pairs of cutters and pairs of feed rollers to cut the sheet into a plurality of narrower strips.

Although this slitting of the sheets appears to be a simple operation, mass production requires continuous high speed operation of the machine. It requires sharp cutters and true rotating slitter members which may be readily replaced when worn or dull. The cutters, for example, must have cooperating sharp peripheral cutting edges which lie in a plane normal to the axes of the shafts and which rotate true, without wobbling, in order to cleanly sever the sheet and to maintain the width of the strip throughout its entire length. These cutters must be frequently sharpened to maintain their keen cutting edges. For this purpose the cutters must be removed from the shafts. Sharpening may be effected by grinding the outer periphery or by grinding the side wall of the cutter. When the periphery is ground the cutter is reduced in diameter. Cutters sharpened in this manner have a short life because they soon are reduced to diameters which no longer overlap each other sufficiently to effect a shearing action.

In side grinding, the cutters are reduced in thickness and thus the cutting edges are displaced laterally so that the shearing action is voided. Side grinding of the cutters is much preferred over peripheral grinding since in side grinding the original diameter of the cutter is preserved. However, in side grinding the cutters, considerable difficulty has been experienced in mounting the cutters on the shafts in a manner which permits of easy, quick removal for sharpening and which permits of replacement on the shaft with the cutting edges in true cutting alignment.

The same difficulty is experienced in mounting the feeding rollers so that they can be quickly and easily removed to permit removal of the cutters and so that they can be readily replaced in such a manner that they will rotate true, without wobble.

An object of the invention is the provision in a slitting machine of slitter element mounting devices which overcome the above mentioned difficulties and wherein true rotating locating faces are provided on the slitter element shafts in predetermined permanently fixed locations and against which predetermined locating faces on the slitter elements are clamped interchangeably with the assurance that the working faces of the slitter elements will rotate true in their proper planes of action irrespective of the degree of sharpening and the number of times they are removed from and remounted on their shafts.

Another object is the provision in such a slitting machine of time saving slitter element mounting devices which permit of easy and quick removal of the slitter elements by slipping the elements along the shafts and over the mountings and removing them from an end thereof.

Another object is the provision of such slitter element mounting devices which with a minimum of movable parts and wearing surfaces insure concentric mounting of the slitter elements on their respective shafts so that the outer peripheries of the elements will rotate true.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a fragmentary portion of a pair of slitter element shafts and their slitter elements as used in a sheet slitting machine and embodying the instant invention;

Figs. 2 and 3 are transverse sectional views as taken substantially along the lines 2—2, 3—3 in Fig. 1;

Fig. 4 is a side elevation of one of the unmounted slitter elements shown in Fig. 2 as mounted;

Fig. 5 is a transverse sectional view of one of the shafts, showing the slitter element mounting members on the shaft; and Fig. 6 is a fragmentary perspective view of the shaft and one of the mounting members shown in Fig. 5.

As a preferred or exemplary embodiment of the instant invention the drawings illustrate a fragmentary portion of the cutting section of a conventional sheet slitting machine, such as for example the tandem slitter disclosed in United States Patent 2,355,079 issued August 8, 1944 to Lyman L. Jones. In such a machine large metallic sheets such as tin plate and the like are slit or cut into strips of a predetermined smaller width for the manufacture of can bodies and other can parts therefrom. This slitting operation is effected by feeding the sheet between cooperating pairs of upper and lower rotary slitting elements which comprise cutters 11 and feed rollers 12. These slitting elements 11, 12 are arranged in spaced and alternating relation and are carried on a pair of spaced and parallel rotatable shafts 13, 14. The shafts are rotated and supported in any suitable manner, such as that disclosed in the above mentioned Jones Patent 2,355,079.

The cutters 11 preferably are ring shaped elements having a smooth cylindrical outer periphery 16 (Figs. 1 and 4) and flat parallel side faces 17, 18 disposed at right angles to the outer periphery 16. The face 17 is adapted to be ground and periodically reground or dressed to provide a keen cutting edge 19 at the periphery of each cutter for the sheet slitting operation. The opposite side face 18 may also be ground if desired to provide a second peripheral cutting edge 20 so that the cutter may be turned around or reversed for continued use when one cutting edge becomes dull, thereby saving time in regrinding both faces at the same time.

The cutters 11 are used in oppositely disposed pairs, one cutter surrounding and being mounted on each shaft 13, 14 for each slit to be cut in the sheet. For example, when six slits are to be cut in a large sheet, six pairs or sets of cutters are used. The cutters 11 on each shaft are disposed along the shaft in spaced relation with their cutting edges 19 spaced apart the width of the strip to be severed from the sheet. Opposing cutters on the shafts 13, 14 are located relative to each other, with their side faces 17 in engagement and slightly overlapping so that they are substantially in one and the same plane, the plane being normal to the axes of the shafts, as shown in Figs. 1 and 2 for cooperating action of the cutters in severing or slitting the sheet.

In order to lock the cutters 11 onto the shafts 13, 14 in this cutting relation and to facilitate ready removal for sharpening and for accurate remounting in the same relation, the shafts 13, 14 are provided with permanently fixed cutter supporting ears or lugs 22 (Figs. 1, 5 and 6) which project radially beyond the periphery of the shafts. These ears 22, may be integrally machined with the shaft but preferably are welded or otherwise attached to the shafts. The drawings show four of these ears for each cutter, although any number may be used in accordance with the diametrical dimensions of the cutters. The ears are equally spaced around the periphery of each shaft. Each ear 22 preferably is crescent shaped with a convex edge face 23 (Fig. 6) and a pair of straight spaced and parallel side faces constituting a cutter locating face 24 and an oppositely disposed locking face 25.

For each set of two cooperating cutters 11, the ears 22 on one shaft are located on one side of the cutting face plane and the ears on the other shaft are disposed on the opposite side of the cutting face plane, with the locating faces 24 of the ears all in the plane as shown in Fig. 1. The cutters 11 are removably secured to these ears 22 with the cutting faces 17 of the cutters in engagement with the locating faces 24 of the ears. For this purpose slots 27 (Figs. 5 and 6) in the ears 22 and cooperating aligned slots 28 (Fig. 4) in the inner ring of the cutters 11 are provided. The cutters are held in place by bolts 29 extending through rectangular washers 30 on the outer faces 18 of the cutters and extending through the slots 28 in the cutters and the slots 27 in the ears 22 and threadedly engaged in rectangular nuts 31 on the outer or locking faces 25 of the ears. The cutters 11 are centralized on their respective shafts 13, 14 in concentric relation therewith by internal radially curved seats 34 which are formed in the cutters and disposed equally distant from the axes of said cutters and which rest on radially curved locating faces 35 formed on the ears 22 or if desired on the shafts adjacent the locating faces 24 of the ears 22 and disposed equally distant from the axes of said shafts.

Hence by removing the bolts 29, the cutters 11 may be readily removed from the ears 22 and slipped off the end of their shafts 13, 14 for resharpening or for turning around as the case may be and readily remounted on the ears without displacement of the cutting edges from the cutting plane. In order to slip the inner cutters past the ears 22 of the outer cutters, the cutters are formed with internal clearance openings 37 (Fig. 4) disposed between the slots 28. These openings preferably are arcuate in shape and larger than the ears 22 to readily clear the ears when the cutters are rotated sufficient to align the openings with the ears.

When a cutter 11 is remounted on its shaft after removal therefrom, with either face 17 or 18 in engagement with the locating faces 24 of its set of ears 22, the cutting edge of the cutter will always be located in the normal cutting plane as mentioned above and hence no adjustment need be made to compensate for the redressing of the cutter. Since all of the locating faces 24 of each set of the ears 22 are always in the same plane, the cutters will always rotate true irrespective of the degree of sharpening and the number of times they are are removed from and remounted on their shafts.

In a similar manner, the feed rollers 12 are mounted on the shafts 13, 14 between the cutters 11, to feed the sheets between the cutters. The outer peripheries of cooperating sets of the rollers engage each other to frictionally advance the sheet between them. For this reason the outer peripheries of the rollers must rotate true. Two kinds of feed rollers are used in practice, those having rigid hard feed faces and those having resilient feed faces. Figs. 1 and 3 of the drawings show both of these types of feed rollers. The upper roller in these figures is of the resilient type. Its outer periphery is smaller in diameter than the lower roller and is formed with an annular groove 41 which locates and carries an annular resilient ring 42 having an outside diameter substantially that of the rigid faced lower roller 12 for sheet feeding cooperation therewith.

The feed rollers 12 are mounted on the shafts 13, 14 by attachment to fixed ears 44 which are similar to the ears 22 and which are welded to the shafts in predetermined positions as in the case of the ears 22. The ears 44 have locating faces 46 similar to the locating faces 24 on the ears 22, against which webs 47 of the rollers 12 are clamped by bolts 48 to secure the rollers to their shafts. The locating faces 46 of each set of ears 44 for each feed roller 12 are disposed in a single plane normal to the axis of their shaft so as to retain the roller in a position with its outer periphery parallel with the axis of its shaft so it will rotate true irrespective of how many times it is removed and remounted with the removal and remounting of the cutters 11. However the locating faces 46 on the ears 44 of one shaft need not be in the same normal plane with the locating faces on the ears 44 of the opposing shaft, as in the case of the cutters 11 since there is no shearing action but merely tangential frictional engagement between the outer peripheries of the rollers. The ears on the two shafts may or may not even be in transverse alignment but may be slightly offset as shown in Fig. 1. The main feature is that the ears 44 for each roller be aligned to hold the roller for true rotation.

In order to support the rollers 12 with their outer peripheries concentric with the axes of the shafts, the webs 47 of the rollers are formed with internal radially curved seats 51 (Fig. 3) which rest on radially curved locating faces 52 (see also Fig. 1) formed on the shafts 13, 14 adjacent the locating faces 46 of the ears 44 and disposed equally distant from the axes of said shafts. Like the cutters 11, the feeding rollers 12 are formed with arcuate clearance openings 53 in the webs 47 of the rollers to permit removal of the rollers from the shafts by sliding them along the shafts over the cutter ears 22 and roller ears 44 fixed on the shafts.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a sheet slitting machine, the combination of a rotatable shaft, a plurality of ears permanently fixed on said shaft in spaced relation around and projecting radially outwardly from its periphery, said ears having flat locating faces disposed in a plane normal to the axis of said shaft, an annular slitter member surrounding said shaft and having an inner centralizing face and a flat side face, said inner centralizing face being engageable with the periphery of said shaft to accurately locate said slitter member centrally thereon, and means for clamping the flat side face of said member against the locating faces of said ears to effect true rotation of said member with said shaft, said slitter member having clearance openings formed therein larger than and corresponding in number to the number of said ears around said shaft and alignable with said ears to facilitate passage of said member thereover toward either end of the shaft to remove said member therefrom.

2. In a sheet slitting machine, the combination of a rotatable shaft, a plurality of ears permanently fixed on said shaft in spaced relation around and projecting radially outwardly from its periphery, said ears having flat locating faces disposed in a plane normal to the axis of said shaft, said ears further having curved locating faces disposed radially outwardly from the periphery and equally distant from the axis of said shaft, an annular ring-shaped slitter member surrounding said shaft and having a flat side face, said ring-shaped member having internal curved seat portions disposed equally distant from the axis of said member for seating engagement with said curved locating faces on said ears to locate said member concentrically on said shaft, said member also having clearance openings formed therein and disposed between said seat portions, said openings being alignable with and larger than said ears to facilitate passage of said member over said ears to remove said member from said shaft, and means for clamping the flat side face of said member against the locating faces of said ears to effect true rotation of said member with said shaft.

3. In a sheet slitting machine, the combination of a shaft, a plurality of ears permanently fixed on said shaft in spaced relation around and projecting radially outwardly from its periphery, said ears having cutter locating faces disposed in a plane normal to the axis of said shaft, and an annular cutter surrounding said shaft and having inner centralizing faces engaging against the periphery of said shaft and a dressible flat face engaging against the locating faces of said ears and providing an annular peripheral cutting edge in the plane of said flat cutter and locating faces, said cutter being removably secured to said ears for easy removal of said cutter to redress said flat face to sharpen said cutting edge and for easy replacement to remount said sharpened cutter without displacement of said cutting edge from said plane, said cutter having clearance openings formed therein larger than and corresponding in number to the number of ears around said shaft and alignable with said ears to facilitate passage of said cutter thereover and toward either end of said shaft to remove said cutter therefrom.

4. In a sheet slitting machine, the combination of a shaft, a plurality of sets of ears permanently fixed on and projecting radially outwardly from the periphery of said shaft, said sets of ears being disposed in spaced relation along said shaft and having cutter locating faces spaced apart predetermined distances in accordance with the widths into which the sheet is to be cut, the ears of each set being disposed in spaced relation around the periphery of said shaft with their locating faces in a plane normal to the axis of said shaft, and a plurality of annular cutters corresponding to the sets of ears, said cutters surrounding said shaft and having inner centralizing faces engaging against the periphery of said shaft and dressible flat faces engaging against the locating faces of said ears and providing annular peripheral cutting edges in the plane of said cutter faces and locating faces, said cutters being removably secured to said ears for easy removal of said cutters to facilitate redressing of said flat faces to sharpen said cutting edges and for easy replacement to remount said sharpened cutters without displacement of said cutting edges from the planes of said locating faces, said cutters having clearance openings formed therein corresponding in number to the number of ears in each set around said shaft, said openings being alignable with said set of ears to facilitate passage of said cutters over said ears toward either end of said shaft to remove said cutters therefrom.

5. In a sheet slitting machine, the combination of a rotatable shaft, a plurality of ears permanently fixed on said shaft in spaced relation around and projecting radially outwardly from its periphery, said ears having inner centralizing faces engaging against the periphery of said shaft and flat locating faces disposed in a plane normal to the axis of said shaft, a sheet feed roller surrounding said shaft and having a flat web face, means for clamping the flat web face of said sheet feed roller against the locating faces of said ears to effect true rotation of said feed roller with said shaft, said feed roller having clearance openings formed therein larger than and corresponding in number to the number of said ears around said shaft, said openings being alignable with said ears to facilitate passage of said feed roller over said ears toward either end of said shaft to remove said feed roller therefrom.

6. In a sheet slitting machine, the combination of a pair of spaced shafts, a plurality of ears permanently fixed on each of said shafts disposed in spaced predetermined relation around and projecting outwardly from the periphery of said shafts and arranged in sets disposed in spaced predetermined relation along said shafts, said ears having flat locating faces, the locating faces of the ears of each set being disposed in a plane normal to the axis of its shaft, a plurality of annular cutters surrounding each of said shafts and having inner centralizing faces and also flat side faces, a plurality of sheet feed rollers also surrounding each of said shafts and having inner centralizing faces, flat web faces and peripheral feed faces, each of said inner faces on the cutters and rollers engaging the periphery of its shaft to centralize the cutters and rollers accurately therewith, and means on said ears, cutters and rollers for clamping the sheet feed roller web faces and the flat side faces of said cutters against the locating faces of alternate sets of ears to effect true rotation of individual pairs of said sheet feed rollers between individual pairs of said cutters so that the peripheral feed faces of said sheet feed rollers will engage with and feed a sheet to be cut by said cutters each of said annular cutters and feed rollers having clearance openings formed therein larger than and corresponding in number to the number of ears in each set around its shaft to facilitate passage of said cutters and rollers longitudinally over said shafts toward either end thereof to remove them from the shafts.

7. In a sheet slitting machine, the combination of a pair of spaced parallel rotatable shafts, a set of ears permanently fixed on said shafts and projecting radially outwardly at spaced intervals around the peripheries of the shafts each ear having a locating face in a plane substantially normal to the axis of its shaft, a pair of cooperating annular slitter members each surrounding a said shaft and having inner faces engaging the periphery of its shaft to locate the slitter member in an accurate centralized position thereon, each of said slitter members also having clearance openings formed therein larger than and alignable with the ears on its shaft for facilitating removal and accurate replacement of the slitter members by permitting their free passage along the shafts and over said ears permanently fixed thereon, and means for clamping said slitter members against said faces of the ears to locate and secure said members in accurate longitudinal positions on the shafts and relative to each other.

8. The combination according to claim 7 wherein a plurality of said sets of ears are spaced axially along each of said shafts and the cooperating pairs of slitter members securable thereto are each formed with clearance openings alignable with the ears in each set on its shaft to permit free passage of the slitter members along the shafts and over the ears permanently fixed thereon for removal and accurate replacement of the slitter members.

References Cited in the file of this patent
UNITED STATES PATENTS

| 459,920 | Wright | Sept. 22, 1891 |
| 570,226 | McAdams | Oct. 27, 1896 |
| 801,916 | Rudolphi | Oct. 17, 1905 |
| 1,873,792 | Sheeler | Aug. 23, 1932 |
| 2,031,246 | Biggert | Feb. 18, 1936 |
| 2,377,130 | Cohen | May 29, 1945 |

FOREIGN PATENTS

| 78,656 | Austria | Oct. 10, 1919 |
| 87,737 | Austria | Mar. 27, 1922 |
| 425,697 | Great Britain | Mar. 20, 1935 |